P. HEUER.
CHANGE SPEED BELT GEARING.
APPLICATION FILED DEC. 5, 1908.

953,144.

Patented Mar. 29, 1910.

Witnesses:
E. A. Singer
Ira J. Morgenthal

Inventor.
Paul Heuer
by B. Singer
Attorney.

UNITED STATES PATENT OFFICE.

PAUL HEUER, OF DRESDEN, GERMANY.

CHANGE-SPEED BELT-GEARING.

953,144.

Specification of Letters Patent. Patented Mar. 29, 1910.

Application filed December 5, 1908. Serial No. 466,089.

*To all whom it may concern:*

Be it known that I, PAUL HEUER, a subject of the German Emperor, and resident of Dresden, Germany, have invented certain new and useful Improvements in Change-Speed Belt-Gearings, of which the following is a specification.

This invention relates to a change speed belt gearing and more especially to a device of this kind whereby high ratios of gearing may be obtained.

To attain the object in view, this change speed belt gearing comprises a series of conical pulleys which are alternately connected between each other and arranged in such a manner that always two opposite pulleys, *i.e.* pulleys which are connected together, have their cones directed in opposite directions.

Figure 1:
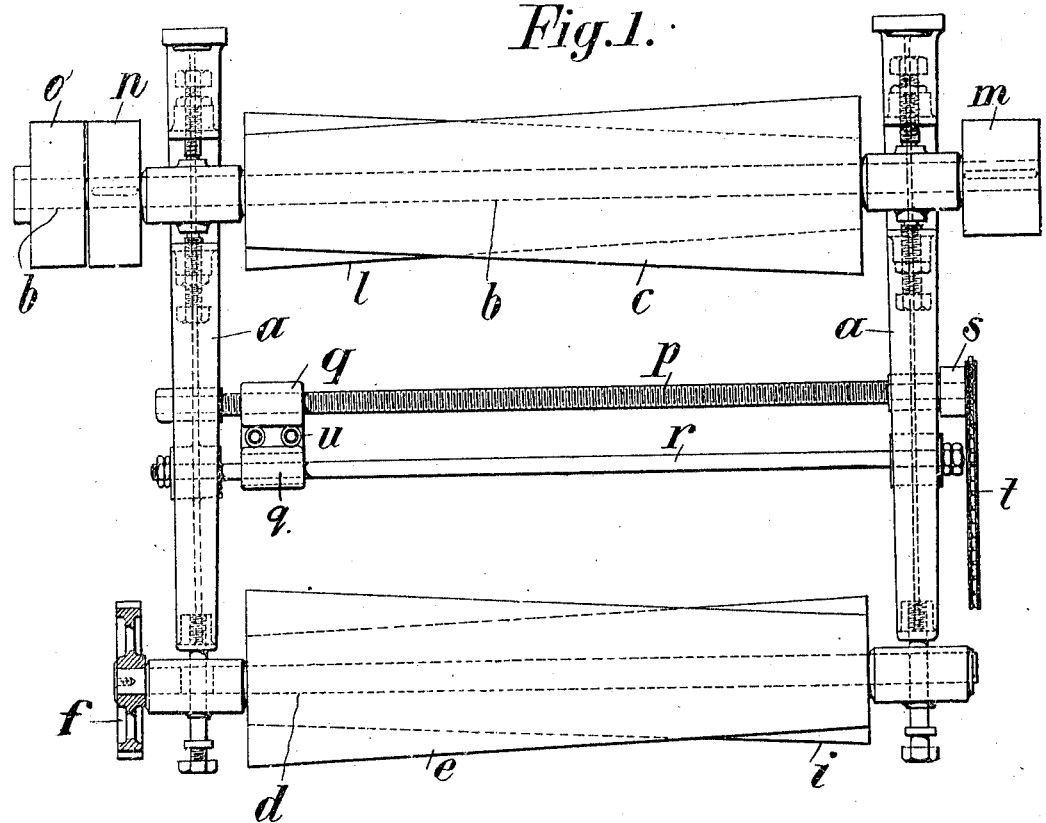
Figure 2:
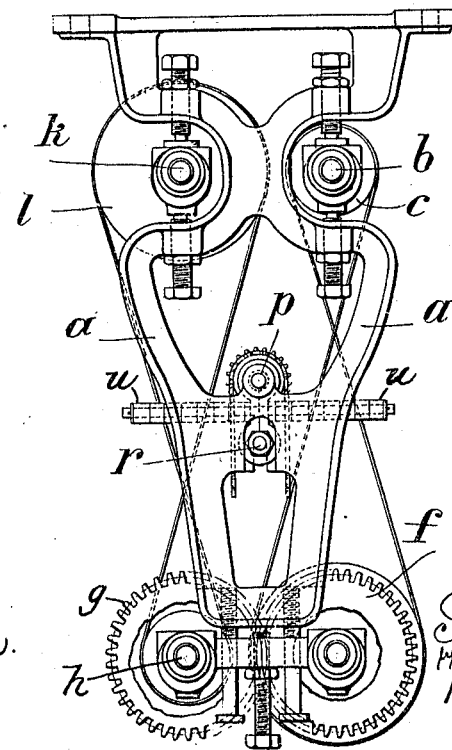

In the accompanying drawings:—Figure 1 shows a front elevation view of the preferred form of my improved change speed belt gearing. Fig. 2 is a side elevation view of same.

In the drop hanger frame $a$ are rotatably supported four conical pulleys arranged in such a manner that always two vertically opposite pulleys have their cones inversely directed. The pulley $c$ is secured to the upper shaft $b$ and is connected by a driving belt with the coöperating conical pulley $e$ carried by the shaft $d$. The latter carries on its outer end a toothed wheel $f$ meshing with a similar toothed wheel $g$ arranged on the outer end of the shaft $h$ supported in the drop hanger frame on one side of the shaft $d$. The shaft $h$ carries between the side members of the frame the cone pulley $i$ which is connected by means of a driving belt with the oppositely arranged cone pulley $l$ keyed on shaft $k$ supported in the framework vertically above the shaft $h$. The shaft $b$ carries on one of its free ends outside the framing a loose and fast pulley $o$, $n$ adapted to transmit rotary motion to the device at a given speed while the shaft $k$ carries at its opposite end a pulley $m$ by means of which the rotary motion may be taken off at the desired modified speed.

Between the upper and lower cone pulleys a screw threaded spindle $p$ is rotatably mounted in the two hanger frames $a$. It is engaged by a traveling sleeve nut $q$ connected with another sleeve $q'$ slidably mounted on a guide rod $r$ which is secured to the hangers under the screw threaded spindle $p$ so as to be parallel to the latter. The spindle $p$ carries preferably at the outside of the frame a sprocket wheel $s$ receiving an actuating chain $t$. The traveling nut $q$ carries on each side a belt fork $u$, one of said belt forks being adapted to engage the belt connecting pulley $c$ with pulley $e$ and the other of said forks engaging the crossed belt connecting pulley $i$ with $l$. As readily seen, when rotary motion is transmitted by means of the chain $t$ to the sprocket wheel $s$ and consequently to the spindle $p$ sliding motion is imparted to the nut $q$ and the two belts are simultaneously shifted in the same direction.

The above described change speed belt gearing works in the following manner:—It may be assumed that all of the pulleys used in this device have the same proportion, *f. i*, that the diameter at the narrow end of the cone is half as large as the diameter at the wider end of the cone. If we assume that to the driving pulley $c$ is imparted a constant speed by the pulley $m$ of one hundred revolutions per minute, then it is obvious that the speed of the pulley $d$ may vary from fifty revolutions to two hundred revolutions per minute, according to the position of the driving belt on the pair of pulleys $c$, $d$. The motion of the driven pulley $d$ is transferred to the driving pulley of the next pair of gearings, and as a similar reduction of speed takes place between the pulleys $i$, $l$ of the next pair, it is obvious that the resulting speed of the driven pulley of the last pair will vary between twenty-five and four hundred revolutions per minute, according to the position of the belts on the pulleys.

Having now fully described my said invention, what I claim and desire to secure by Letters Patent, is:—

A change speed belt gearing comprising in combination, two pairs of parallel shafts, two pairs of cone pulleys, each of said cone pulleys being mounted on one of said shafts, belts connecting the pulleys of each pair, gears adapted to transmit the motion of the driven pulley of one pair to the driving pulley of the other pair, an element adapted to be shifted longitudinally parallel with said shafts, two belt forks attached to said member and adapted to engage said belts, and means for shifting said member parallel with said shafts, substantially as described and for the purpose set forth.

In testimony whereof I have hereunto set my hand in presence of two witnesses.

PAUL HEUER.

Witnesses:
ULYSSES J. BYWATER,
CLÄRE SIMAN.